US012795448B2

(12) United States Patent
Shete et al.

(10) Patent No.: US 12,795,448 B2
(45) Date of Patent: Nov. 10, 2026

(54) RADIO ACCESS NETWORK CONTROL BY A VIRTUAL INFRASTRUCTURE AND A RADIO ACCESS NETWORK NODE

(71) Applicant: RAKUTEN MOBILE, INC., Tokyo (JP)

(72) Inventors: Pankaj Shete, Tokyo (JP); Awn Muhammad, Tokyo (JP); Shivanshu Rajan, Indore (IN); Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 560 days.

(21) Appl. No.: 17/997,026

(22) PCT Filed: Mar. 8, 2022

(86) PCT No.: PCT/JP2022/010111
§ 371 (c)(1),
(2) Date: Oct. 24, 2022

(87) PCT Pub. No.: WO2023/100385
PCT Pub. Date: Jun. 8, 2023

(65) Prior Publication Data
US 2024/0236766 A1 Jul. 11, 2024

(30) Foreign Application Priority Data
Dec. 3, 2021 (IN) ............................ 202141056085

(51) Int. Cl.
*H04W 28/084* (2023.01)
*H04W 28/08* (2023.01)

(52) U.S. Cl.
CPC ..... *H04W 28/084* (2023.05); *H04W 28/0925* (2020.05)

(58) Field of Classification Search
None
See application file for complete search history.

(56) References Cited

U.S. PATENT DOCUMENTS 11,836,551 B2 * 12/2023 Subramani Jayavelu .................. G06F 9/546
11,997,159 B2 * 5/2024 Cuomo, Jr. ............ H04L 43/16
(Continued)

FOREIGN PATENT DOCUMENTS

EP 3869847 A1 * 8/2021 ........... H04W 16/02
JP 202183058 A 5/2021
KR 20230031695 A * 3/2023 ........... H04W 24/04

OTHER PUBLICATIONS

O-RAN Architecture Description 2.0 O-RAN.WG1.O-RAN-Architecture-Description.v02.00, Oct. 2020 https://specifications.o-ran.org/download?id=11 (Year: 2020).*
(Continued)

*Primary Examiner* — Pao Sinkantarakorn
*Assistant Examiner* — Paul A. Langer
(74) *Attorney, Agent, or Firm* — HAUPTMAN HAM, LLP

(57) ABSTRACT

A radio access network control apparatus has at least one processor that performs: acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data. The issuing the operational policy includes issuing a resource allocation policy concerning the resource allocation of the plurality of radio access network nodes to the (Continued)

virtual infrastructure, and a traffic control policy concerning the traffic control of each of the radio access network nodes to each of the radio access network nodes.

5 Claims, 4 Drawing Sheets

(56) References Cited

U.S. PATENT DOCUMENTS

| | | | | |
|---|---|---|---|---|
| 12,082,006 | B2 * | 9/2024 | Wang | H04W 24/10 |
| 2021/0029580 | A1 * | 1/2021 | Gupta | H04W 24/02 |
| 2021/0204148 | A1 * | 7/2021 | Chou | H04W 24/02 |
| 2021/0258866 | A1 * | 8/2021 | Chou | H04W 24/02 |
| 2022/0014942 | A1 * | 1/2022 | Ying | H04L 67/55 |
| 2022/0014963 | A1 * | 1/2022 | Yeh | G06N 3/045 |
| 2022/0022044 | A1 * | 1/2022 | D'Oro | H04W 48/18 |
| 2022/0167236 | A1 * | 5/2022 | Melodia | H04W 28/24 |
| 2023/0209370 | A1 * | 6/2023 | Pateromichelakis | G06N 20/00 370/328 |
| 2023/0403543 | A1 * | 12/2023 | Pateromichelakis | H04W 24/02 |
| 2024/0236766 | A1 * | 7/2024 | Shete | H04L 41/0894 |
| 2024/0259879 | A1 * | 8/2024 | Ranganath | H04L 41/5054 |
| 2024/0378506 | A1 * | 11/2024 | D'Oro | G06N 20/00 |

OTHER PUBLICATIONS

O-RAN Architecture Description 4.0 O-RAN.WG1.O-RAN-Architecture-Description-v04.00, Jun. 2021 https://specifications.o-ran.org/download?id=64 (Year: 2021).*

O-RAN Architecture Description 5.0 O-RAN.WG1.O-RAN-Architecture-Description-v05.00, Oct. 2021 https://specifications.o-ran.org/download?id=154 (Year: 2021).*

O-RAN Architecture Description 2.0 O-RAN.WG1.O-RAN-Architecture-Description.v02.00, Oct. 2020 https://specifications.o-ran.org/download?id=11 (Year: 2020) (Year: 2020).*

KR_20230031695_A_machine_translation (Year: 2023).*

Andres Garcia-Saavedra et al. "O-RAN: Disrupting Then Virtualized Ran Ecosystem", Wireless and Radio Communications, IEEE Communications Standards Magazine, Dec. 2021, p. 96-103, 8pp.

Bharath Balasubramanian et al., "RIC: A RAN Intelligent Controller Platform for AI-Enabled Cellular Networks", Theme Article: AI-Powered 5G Services, Apr. 16, 2021, p. 7-17, IEEE Computer Society, IEEE Internet Computing, 11pp.

* cited by examiner

RADIO ACCESS NETWORK CONTROL BY A VIRTUAL INFRASTRUCTURE AND A RADIO ACCESS NETWORK NODE

RELATED APPLICATIONS

The present application is a National Phase of PCT/JP2022/010111, filed Mar. 8, 2022, and claims priority based on Indian Patent Application number 202141056085, filed Dec. 3, 2021.

BACKGROUND OF THE INVENTION

1. Field of the Invention

The present disclosure relates to radio access network control by a virtual infrastructure and a radio access network node.

2. Description of the Related Art

For the purpose of the so-called open radio access network (RAN) in a mobile communication system, "Open RAN", "O-RAN", "vRAN" and the like are being considered. In the specification, "O-RAN" is used as a comprehensive term for such various "open RANs". Therefore, the interpretation of "O-RAN" in the specification is not limited to the standard and/or the specification of the same name "O-RAN" specified by the O-RAN Alliance. In an O-RAN, a virtual infrastructure also referred to as O-Cloud that virtually manages a set of a plurality of radio access network nodes (RAN nodes) is provided.

Patent Literature 1: JP-A-2021-83058

SUMMARY OF THE INVENTION

A processor such as Non-RT RIC (Non-Real Time RAN Intelligent Controller) that constitutes the controller of the O-RAN, issues a resource allocation policy concerning a resource allocation of the plurality of RAN nodes, based on the operational states of the plurality of RAN nodes acquired from the O-Cloud. Through independent consideration, it has been found that a processor such as the Non-RT RIC can further improve the efficiency of the O-RAN control.

The present disclosure was made in view of the circumstances, and the purpose is to provide a radio access network control apparatus and the like that can improve the efficiency of radio access network control.

In order to solve the above issue, a radio access network control apparatus in a certain aspect of the present disclosure includes at least one processor that performs: acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

According to the aspect, the processor can issue an operational policy that can efficiently operate each RAN node, to at least one of the virtual infrastructure and each RAN node, by considering the operational data acquired from each RAN node in addition to the operational states of the plurality of RAN nodes acquired from the virtual infrastructure.

Another aspect of the present disclosure is a radio access network control method. The method includes: acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

Further another aspect of the present disclosure is a computer-readable medium. The computer-readable medium stores a radio access network control program causing a computer to perform: acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

In addition, any combination of the above components, and any conversion of the expression of the present disclosure among methods, devices, systems, recording media, computer programs and the like, is also valid as an aspect of the present disclosure.

According to the present disclosure, the efficiency of radio access network control can be improved.

DETAILED DESCRIPTION OF THE INVENTION

In the following, the present embodiment is described in accordance with the "O-RAN" which is the standard and/or the specification developed by the O-RAN Alliance. Therefore, the known terms defined in "O-RAN" will be used in the present embodiment just for convenience, but the technologies according to the disclosure can be applied to other existing radio access networks such as "Open RAN" and "vRAN" and/or to similar radio access networks that may be developed in the future.

Figure 1:
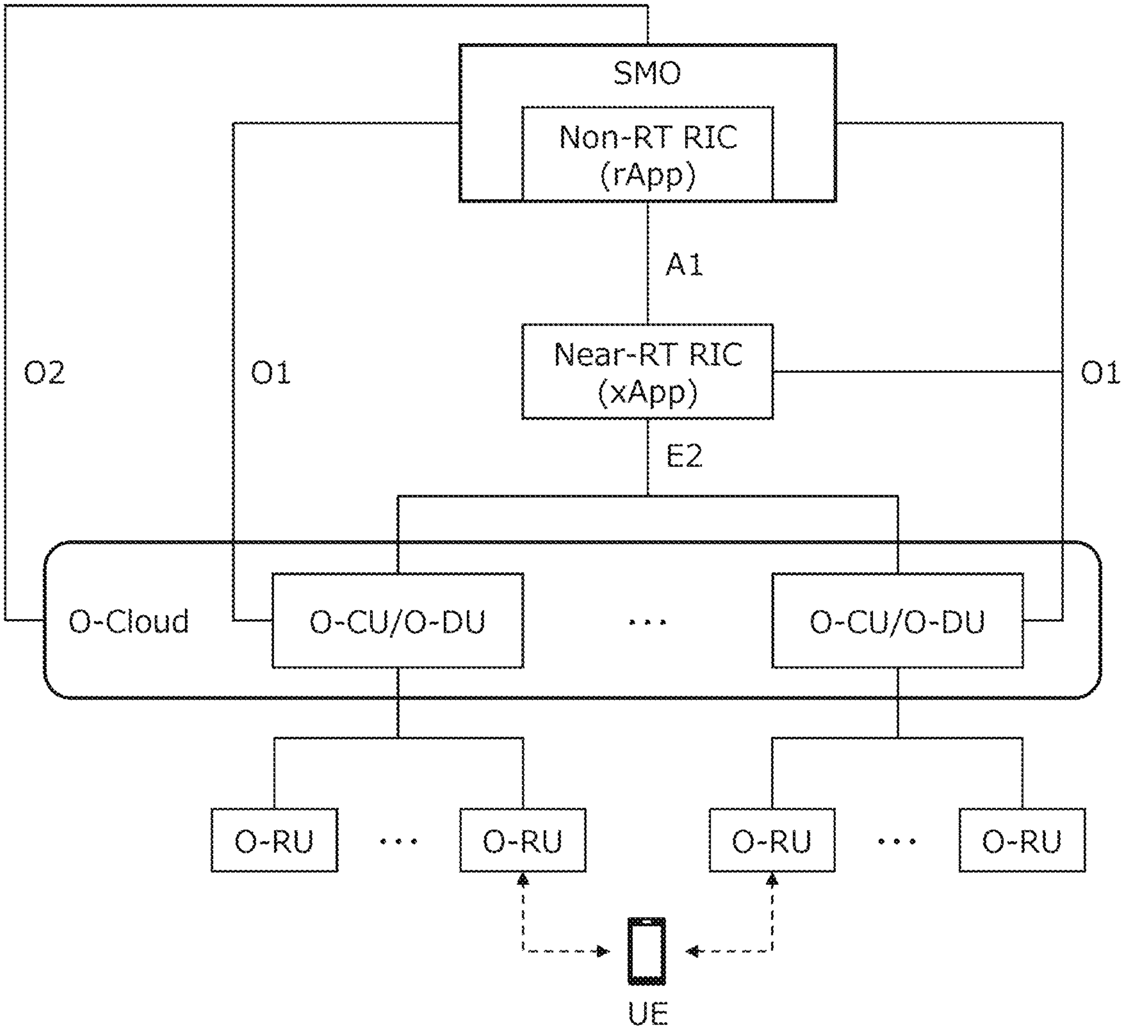
FIG. 1 is a schematic overview of a radio access network control apparatus.

FIG. 1 shows a schematic overview of the radio access network control apparatus according to the present embodiment. The radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (e.g. 1 second or longer), issues guidelines, policies, guidance and the like concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (e.g. shorter than 1 second), executes application software called xApp to control each RAN node (O-CU/O-DU) itself and/or general-purpose hardware and the like in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data and the like of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (e.g. Open Fronthaul (M-Plane)).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
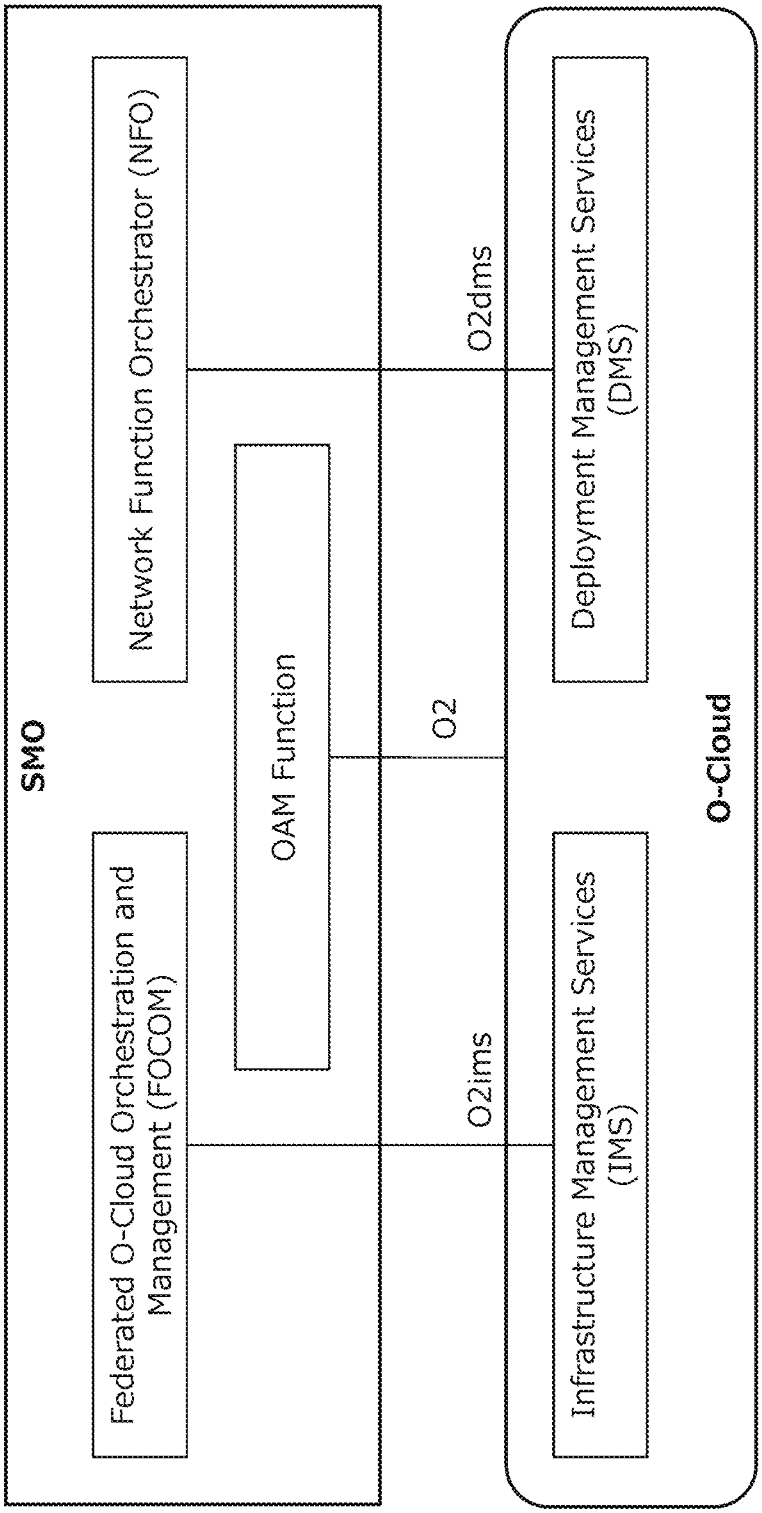
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2ims). The NFO realizes the orchestrated operation of a set of network functions (NFs) by a plurality of NF Deployments in the O-Cloud, while receiving services from the DMS of the O-Cloud through the O2 interface (O2dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2ims and/or the O2dms. The IMS is responsible for managing the O-Cloud resources (hardware) and/or the software used for managing them, and provides services primarily to the FOCOM of the SMO. The DMS is responsible for the management of the plurality of NF Deployments in the O-Cloud, specifically the initiation, monitoring, termination and the like, and provides services primarily to the NFO of the SMO.

Figure 3:
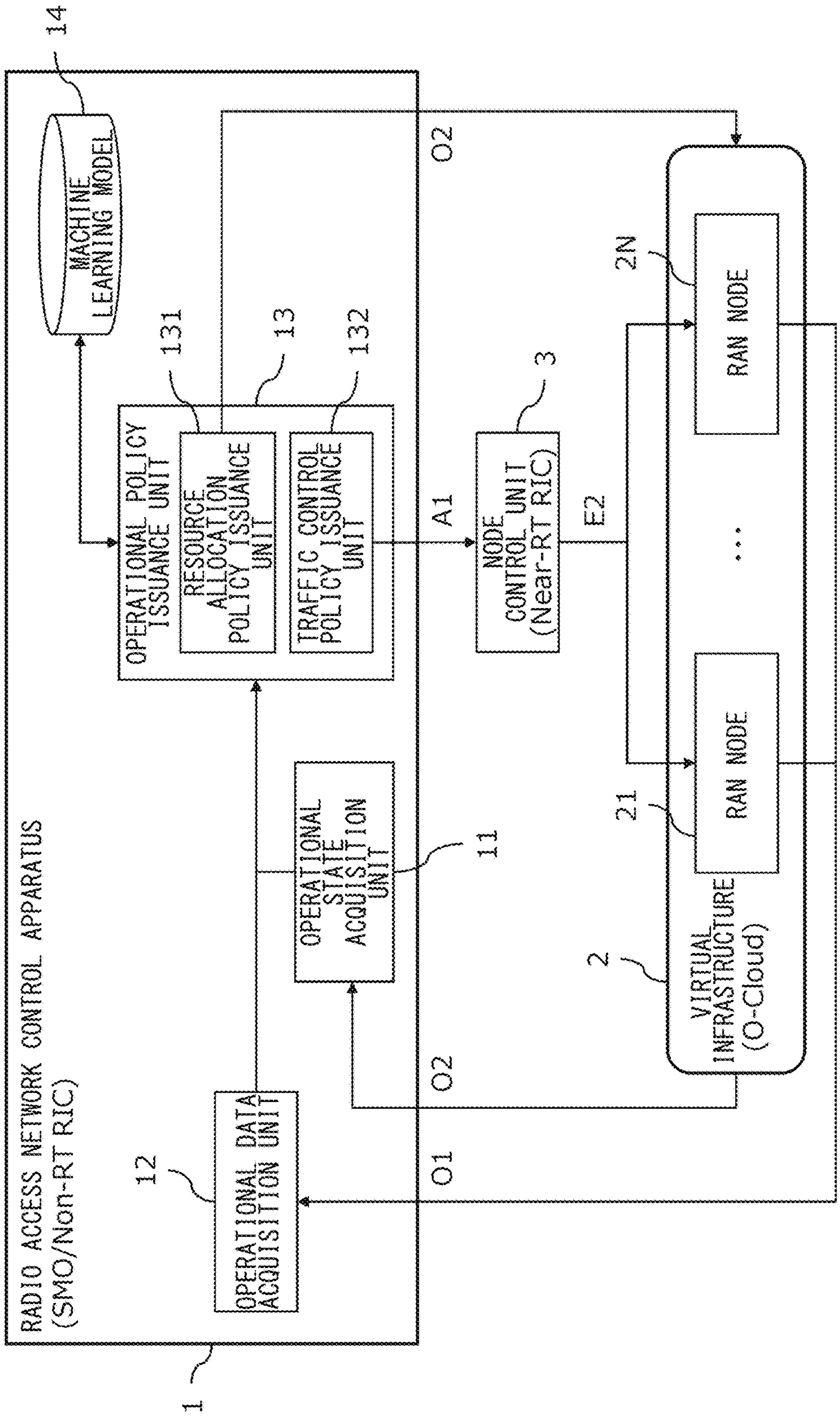
FIG. 3 is a functional block diagram schematically showing the radio access network control apparatus.

FIG. 3 is a functional block diagram schematically showing the radio access network control apparatus 1 according to the present embodiment. The radio access network control apparatus 1 includes an operational state acquisition unit 11, an operational data acquisition unit 12, an operational policy issuance unit 13 and a machine learning model storage unit 14. The functional blocks are realized by the cooperation of hardware resources, such as the central processing unit, memory, input devices, output devices, and peripheral devices connected to the computer, and software that is executed using them. Regardless of the type of computer or the installation location, each of the above functional blocks may be realized with the hardware resources of a single computer, or by combining hardware resources distributed across plurality of computers. Especially in the present embodiment, some or all of the functional blocks of the radio access network control apparatus 1 may be realized in a processor provided in the SMO and/or the Non-RT RIC, or may be realized in a computer and/or a processor provided outside the SMO and/or the Non-RT RIC in a distributed manner or a centralized manner.

The operational state acquisition unit 11 acquires failures and/or operational states of the plurality of RAN nodes 21 to 2N (N is an integer greater than or equal to 2) through the O2 interface from the O-Cloud as a virtual infrastructure 2 that virtually manages a set of the plurality of RAN nodes 21 to 2N. The operational state that can be acquired from the O-Cloud by the operational state acquisition unit 11 includes the state or the status of resource usage and/or communication load in each RAN node 21 to 2N. The operational states of the plurality of RAN nodes 21 to 2N may be acquired, for example, from the IMS realized in the O-Cloud through the O2ims interface by the FOCOM realized in the SMO and/or the Non-RT RIC, and/or from the O-Cloud through the O2 interface by the OAM Function realized in the SMO and/or the Non-RT RIC.

The operational data acquisition unit 12 acquires operational data of each RAN node 21 to 2N measured individually, from each of the RAN nodes 21 to 2N, each O-RU and/or the Near-RT RIC and the like as a node control unit 3 through the O1 interface and the like. The operational data that can be individually acquired for each RAN node 21 to 2N by the operational data acquisition unit 12 can be various data detectable in a base station of normal mobile communication. Examples of the operational data include: the communication volume per time period and/or the communication speed; the number and/or the type of connected UEs (communication devices); the strength and/or the mode of communication signal from UE; the quality of the channel between UE and O-RU; the coverage and/or the available bandwidth of the communication cell provided by O-RU; and the capability and/or the state and the like of the hardware of RAN nodes 21 to 2N and/or O-RU.

The operational policy issuance unit 13 issues an operational policy concerning the operation of each of the RAN nodes 21 to 2N, to at least one of the virtual infrastructure 2 and each RAN nodes 21 to 2N, based on the failures and/or the operational states of the plurality of RAN nodes 21 to 2N acquired through the O2 interface from the virtual infrastructure 2 by the operational state acquisition unit 11, and the individual operational data of each RAN node 21 to 2N acquired through the O1 interface and the like by the operational data acquisition unit 12. The operational policy issuance unit 13 includes a resource allocation policy issuance unit 131 that issues a resource allocation policy and/or a workload management policy concerning the resource allocation and/or the workload management of the plurality of RAN nodes 21 to 2N. The resource allocation policy and the workload management policy are examples of the operational policy issued to the virtual infrastructure 2 through the O2 interface.

In addition, the operational policy issuance unit 13 includes a traffic control policy issuance unit 132 that issues a traffic control policy concerning the traffic control of each of the RAN nodes 21 to 2N. The traffic control policy is an example of the operational policy issued to each of the RAN nodes 21 to 2N. Specifically, the operational policy issuance unit 13 and/or the traffic control policy issuance unit 132, which are at least partially comprised by the Non-RT RIC, issue the operational policy and/or the traffic control policy to the node control unit 3 comprised by the Near-RT RIC through the A1 interface. The node control unit 3 controls each RAN node 21 to 2N through the E2 interface, based on the operational policy and/or the traffic control policy received through the A1 interface. For example, if the traffic control policy is to reduce the traffic at a specific RAN node, the node control unit 3 performs a traffic restriction process to such RAN node itself and/or UEs in the communication cell provided by O-RU connected to such RAN node. Examples of the traffic restriction process include: directing UEs connected to the specific RAN node to other available RAN nodes; restricting the communication speed and/or the communication volume of UEs connected to the specific RAN node; and restricting the connection of new UEs to the specific RAN node.

The operational policy issuance unit 13 issues the operational policy including the resource allocation policy, the workload management policy and the traffic control policy, based on a machine learning model stored in the machine learning model storage unit 14. The machine learning model is capable of deriving a set of the operational policies, from a set of the failures and/or the operational states of the plurality of RAN nodes 21 to 2N acquired through the O2 interface from the virtual infrastructure 2 by the operational state acquisition unit 11, and the individual operational data of each RAN node 21 to 2N acquired through the O1 interface and the like by the operational data acquisition unit 12. Specifically, the machine learning model to which a set of the operational state from the operational state acquisition unit 11 and the operational data from the operational data acquisition unit 12 have been input, outputs a set of the operational policies such as the resource allocation policy and/or the workload management policy issued to the virtual infrastructure 2 through the O2 interface and the traffic control policy issued to each of the RAN nodes 21 to 2N, based on machine learning conducted in advance using comprehensive training data and/or teacher data that relate the input and the output.

In such a manner, the machine learning model of the present embodiment relates a set of the input from the virtual infrastructure 2 (operational state) and the input from each RAN node 21 to 2N (operational data), to a set of the output to the virtual infrastructure 2 (the resource allocation policy, the workload management policy and the like) and the output to each RAN node 21 to 2N (the traffic control policy and the like). Compared with the simple case where the input from the virtual infrastructure 2 is individually mapped to the output to the virtual infrastructure 2, and the input from each RAN node 21 to 2N is individually mapped to the output to each RAN node 21 to 2N, the machine learning model of the present embodiment allows holistic or comprehensive considerations of the correlation and the like between the inputs and the outputs of the virtual infrastructure 2 and each RAN node 21 to 2N. Therefore, it is possible to effectively administer the operational policy for the efficient operation of each RAN node 21 to 2N, from both the virtual infrastructure 2 and each RAN node 21 to 2N.

Figure 4:
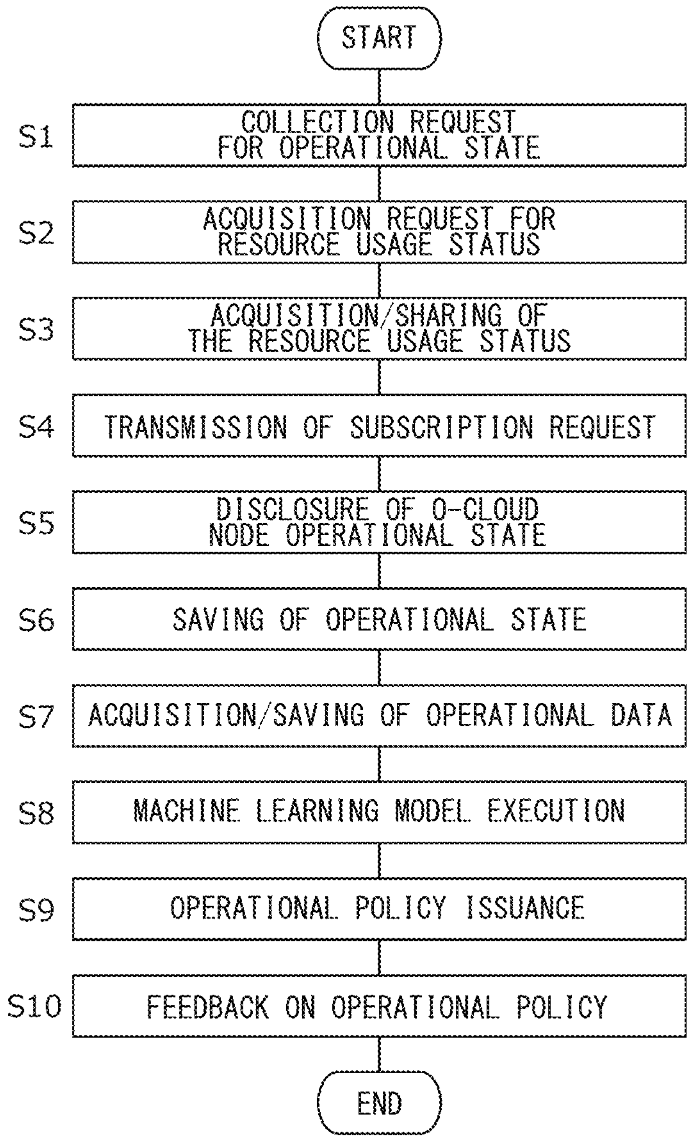
FIG. 4 is a flowchart showing an example of RAN control by the radio access network control apparatus.

FIG. 4 is a flowchart showing an example of RAN control by the radio access network control apparatus 1 according to the present embodiment. "S" in the flowchart means step or process. The RAN control in the figure is executed when a new operational policy is issued for the virtual infrastructure 2 and/or each RAN node 21 to 2N, and/or when an event occurs that should be considered for updating the issued operational policy.

In S1, the rApp executed by the Non-RT RIC requests the SMO to collect the operational state from the virtual infrastructure 2. In S2, the Non-RT RIC transmits an acquisition request of the resource usage status from the virtual infrastructure 2 (O-Cloud) through the OAM Function (FIG. 2) of the SMO. In S3, the OAM Function of the SMO shares with the Non-RT RIC the resource usage status acquired from the virtual infrastructure 2 through the O2 interface in response to the acquisition request in S2. In S4, if the Non-RT RIC identifies a service in the virtual infrastructure 2 (O-Cloud) that is useful for formulating the operational policy, it transmits a subscription request to the IMS of the O-Cloud through the O2-IMS (O2ims) interface. In S5, the IMS of the virtual infrastructure 2 (O-Cloud) discloses the operational state of the nodes on the O-Cloud with which each RAN node 21 to 2N is associated, to the Non-RT RIC through the O2 interface. In S6, the Non-RT RIC functioning as the operational state acquisition unit 11 saves the information on the operational state provided from the virtual infrastructure 2 (O-Cloud) in S3 and/or S5, in a form that can be input to the machine learning model stored in the machine learning model storage unit 14.

In S7, the Non-RT RIC and/or the SMO functioning as the operational data acquisition unit 12, acquire the operational data (more specific information than the operational state saved in S6) individually measured for each RAN node 21 to 2N through the O1 interface and the like, and saves it in a form that can be input to the machine learning model stored in the machine learning model storage unit 14. In S8, the rApp executed by the Non-RT-RIC, which functions as the operational policy issuance unit 13, inputs a set of the operational state saved in S6 and the operational data saved in S7 to the machine learning model stored in the machine learning model storage unit 14. In S9, the rApp executed by the Non-RT RIC, which functions as the operational policy issuance unit 13, issues the operational policy derived by the machine learning model in S8 to the virtual infrastructure 2 and/or each RAN node 21 to 2N. The followings are three specific examples of the operational policy.

In the first specific example, the utilization rate of the O-Cloud resources is detected to be high according to the operational state saved in S6, and it is detected that the UE currently using such O-Cloud resources (RAN node 21 to 2N and/or O-RU) can also use other resources according to the operational state saved in S6 and/or the operational data saved in S7. In such a case, the rApp and/or the Non-RT RIC, which function as the traffic control policy issuance unit 132, issues the traffic control policy that directs the UE traffic from the RAN Nodes 21 to 2N with relatively high utilization rate to the RAN Nodes 21 to 2N with relatively low utilization rate, to the Near-RT RIC (node control unit 3) through the A1 interface.

In the second specific example, the utilization rate of the O-Cloud resources is detected to be high according to the operational state saved in S6, and it is detected that the UE currently using such O-Cloud resources (RAN node 21 to 2N and/or O-RU) cannot use other resources according to the operational state saved in S6 and/or the operational data saved in S7. In such a case, the rApp and/or the Non-RT RIC, which function as the resource allocation policy issuance unit 131, issues the resource allocation policy that allocates additional resources to the RAN nodes 21 to 2N with relatively high utilization rate, to the O-Cloud (virtual infrastructure 2) through the NFO of the SMO and the O2 (O2dms) interface.

In the third specific example, the utilization rate of the O-Cloud resources is detected to be low according to the operational state saved in S6, and it is detected that the UE currently using such O-Cloud resources (RAN node 21 to 2N and/or O-RU) can also use other resources according to the operational state saved in S6 and/or the operational data saved in S7. In such a case, the rApp and/or the Non-RT RIC, which function as the traffic control policy issuance unit 132, may issue the traffic control policy that directs the UE traffic from the RAN Nodes 21 to 2N with relatively low utilization rate to the other RAN Nodes 21 to 2N, to the Near-RT RIC (node control unit 3) through the A1 interface. Furthermore, the rApp and/or the Non-RT RIC, which function as the resource allocation policy issuance unit 131, may issue the resource allocation policy that reduces resources of the RAN nodes 21 to 2N with extremely low utilization rate after the traffic shifted to the other RAN Nodes 21 to 2N, to the O-Cloud (virtual infrastructure 2) through the NFO of the SMO and the O2 (O2dms) interface.

In 510, the Near-RT RIC (node control unit 3) provides feedback on the operational policy such as the traffic control policy issued in S9 to the rApp and/or the Non-RT RIC through the O1 interface and the like and/or the NFO and/or the OAM Function in the SMO provide feedback from the O-Cloud (virtual infrastructure 2) on the operational policy such as the resource allocation policy issued in S9 to the rApp and/or the Non-RT RIC through the O2 interface.

When applying the above described embodiment to the existing "O-RAN" specified by the O-RAN Alliance, it is preferable to make the following changes to the SMO and/or the Non-RT RIC.

(1) The R1 interface connecting the rApp and the Non-RT RIC platform can subscribe to the O-Cloud through the O2-related services (e.g. monitoring of the O-Cloud resource usage status provided by the IMS through the O2ims interface)

(2) The Non-RT RIC can request reconfiguration of the configuration parameters of the O-Cloud nodes (i.e. O-Cloud resources) for non-real-time optimization. The rApp in such a case provides a mechanism for control or policy issuance for the O-Cloud nodes over the O2-DMS interface through the NFO of the SMO and/or the O2-IMS interface.

(3) R1 GAP specification can support various O2-related services (e.g. subscription to the O-Cloud resource usage status monitoring service provided by the IMS through the O2ims interface, O2 reconfiguration request for non-real-time optimization and the like) should be able to be supported.

(4) The NFO and/or the FOCOM of the SMO can support the policy issuance from the Non-RT RIC for the NF generation in DMS of the O-Cloud.

(5) The O2 termination is specified for policy management for the DMS from the rApp through the NFO of the SMO and/or mapping of O-Cloud nodes to E2 nodes (each RAN node 21 to 2N) and the like.

The present disclosure has been described above based on embodiments. It is understood by those skilled in the art that the embodiments are exemplary and that various variations are possible in the combination of each component and/or each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure may be expressed as the following items.

1. A radio access network control apparatus comprising at least one processor that performs:

acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

2. The radio access network control apparatus according to item 1, wherein the issuing the operational policy includes issuing a resource allocation policy concerning the resource allocation of the plurality of radio access network nodes to the virtual infrastructure.

3. The radio access network control apparatus according to item 1 or 2, wherein the issuing the operational policy includes issuing a traffic control policy concerning the traffic control of each of the radio access network nodes to each of the radio access network nodes.

4. The radio access network control apparatus according to any of items 1 to 3, wherein the at least one processor is comprised by the Non-RT RIC (Non-Real Time RAN Intelligent Controller).

5. The radio access network control apparatus according to any of items 1 to 4, wherein the acquiring the operational state includes the at least one processor acquiring the operational state from the virtual infrastructure through the O2 interface, and the issuing the operational policy includes the at least one processor issuing the operational policy to the virtual infrastructure through the O2 interface.

6. The radio access network control apparatus according to any of items 1 to 5, wherein the acquiring the operational data includes the at least one processor acquiring the operational data from each of the radio access network nodes through the O1 interface.

7. The radio access network control apparatus according to any of items 1 to 6, wherein the issuing the operational policy includes the at least one processor issuing the operational policy to the Near-RT RIC (Near-Real Time RAN Intelligent Controller) through the A1 interface.

8. The radio access network control apparatus according to item 7, wherein the Near-RT RIC controls each of the radio access network nodes based on the operational policy through the E2 interface.

9. The radio access network control apparatus according to any of items 1 to 8, wherein the at least one processor comprises a machine learning model capable of deriving the operational policy from the operational state and the operational data, and the issuing the operational policy includes issuing the operational policy derived by the machine learning model.

10. A radio access network control method comprising:

acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

11. A computer-readable medium storing a radio access network control program causing a computer to perform:

acquiring operational states of a plurality of radio access network nodes from a virtual infrastructure that virtually manages a set of the plurality of radio access network nodes; acquiring measured operational data from each of the radio access network nodes; and issuing an operational policy concerning the operation of each of the radio access network nodes, to at least one of the virtual infrastructure and each of the radio access network nodes, based on the operational state and the operational data.

The application claims priority of Indian patent application 202141056085, filed on Dec. 3, 2021, which is hereby incorporated by reference in its entirety.

The present disclosure relates to radio access network control by a virtual infrastructure and a radio access network node.

1 radio access network control apparatus, 2 virtual infrastructure, 3 node control unit, 11 operational state acquisition unit, 12 operational data acquisition unit, 13 operational policy issuance unit, 14 machine learning model storage unit, 21 to 2N RAN node, 131 resource allocation policy issuance unit, 132 traffic control policy issuance unit.

What is claimed is:

1. A radio access network control apparatus comprising at least one processor that performs:

acquiring operational states of a plurality of radio access network nodes from a virtual infrastructure that manages the plurality of radio access network nodes;

acquiring measured operational data from each of the radio access network nodes; and issuing an operational policy concerning the operation of each of the radio access network nodes based on the operational states and the measured operational data, wherein the issuing the operational policy includes issuing a resource allocation policy concerning the resource allocation of the plurality of radio access network nodes to the virtual infrastructure, wherein the issuing the operational policy includes issuing a traffic control policy concerning the traffic control of each of the radio access network nodes to a Near-Real Time RAN Intelligent Controller (Near-RT RIC), wherein the acquiring the operational states includes the at least one processor acquiring the operational state from the virtual infrastructure through an O2 interface, wherein the issuing the operational policy includes the at least one processor issuing the resource allocation policy to the virtual infrastructure through the O2 interface, wherein the acquiring the measured operational data includes the at least one processor acquiring the operational data from each of the radio access network nodes through an O1 interface, wherein the issuing the operational policy includes the at least one processor issuing the traffic control policy to the Near-RT RIC through an A1 interface, wherein the Near-RT RIC controls each of the radio access network nodes based on the traffic control policy through an E2 interface, wherein the at least one processor comprises a single machine learning model configured to derive both the traffic control policy and the resource allocation policy from the measured operational data acquired through the O1 interface and the operational states acquired through the O2 interface, wherein the issuing the traffic control policy causes the Near-RT RIC to perform a traffic restriction process to a specific RAN node when reducing traffic at the specific RAN node, the traffic restriction process comprising at least one of:

directing user equipments (UEs) connected to the specific RAN node to an available RAN node;

restricting a communication speed or a communication volume of the UEs connected to the specific RAN node; or restricting a connection of an additional UE to the specific RAN node, and wherein the resource allocation policy issued through the O2 interface causes reduction of allocated resources of the specific RAN node after the traffic of the specific RAN node has been shifted to one or more other RAN nodes by the traffic control policy.

2. The radio access network control apparatus according to claim 1, wherein the at least one processor is comprised by a Non-Real Time RAN Intelligent Controller (Non-RT RIC).

3. The radio access network control apparatus according to claim 1, wherein the at least one processor comprises a machine learning model capable of deriving the operational policy from the operational states and the measured operational data, and the issuing the operational policy includes issuing the operational policy derived by the machine learning model.

4. A radio access network control method comprising:

acquiring operational states of a plurality of radio access network nodes from a virtual infrastructure that manages the plurality of radio access network nodes;

acquiring measured operational data from each of the radio access network nodes; and issuing an operational policy concerning the operation of each of the radio access network nodes based on the operational states and the measured operational data, wherein the issuing the operational policy includes issuing a resource allocation policy concerning the resource allocation of the plurality of radio access network nodes to the virtual infrastructure, wherein the issuing the operational policy includes issuing a traffic control policy concerning the traffic control of each of the radio access network nodes to a Near-Real Time RAN Intelligent Controller (Near-RT RIC), wherein the acquiring the operational states includes the at least one processor acquiring the operational state from the virtual infrastructure through an O2 interface, wherein the issuing the operational policy includes the at least one processor issuing the resource allocation policy to the virtual infrastructure through the O2 interface, wherein the acquiring the measured operational data includes the at least one processor acquiring the operational data from each of the radio access network nodes through an O1 interface, wherein the issuing the operational policy includes the at least one processor issuing the traffic control policy to the Near-RT RIC through an A1 interface, wherein the Near-RT RIC controls each of the radio access network nodes based on the traffic control policy through an E2 interface, wherein the at least one processor comprises a single machine learning model configured to derive both the traffic control policy and the resource allocation policy from the measured operational data acquired through the O1 interface and the operational states acquired through the O2 interface, wherein the issuing the traffic control policy causes the Near-RT RIC to perform a traffic restriction process to a specific RAN node when reducing traffic at the specific RAN node, the traffic restriction process comprising at least one of:

directing user equipments (UEs) connected to the specific RAN node to an available RAN node;

restricting a communication speed or a communication volume of the UEs connected to the specific RAN node; or restricting a connection of an additional UE to the specific RAN node, and wherein the resource allocation policy issued through the O2 interface causes reduction of allocated resources of the specific RAN node after the traffic of the specific RAN node has been shifted to one or more other RAN nodes by the traffic control policy.

5. A non-transitory computer-readable medium storing a radio access network control program causing a computer to perform:

acquiring operational states of a plurality of radio access network nodes from a virtual infrastructure that manages the plurality of radio access network nodes;

acquiring measured operational data from each of the radio access network nodes; and issuing an operational policy concerning the operation of each of the radio access network nodes based on the operational states and the measured operational data, wherein the issuing the operational policy includes issuing a resource allocation policy concerning the resource allocation of the plurality of radio access network nodes to the virtual infrastructure, wherein the issuing the operational policy includes issuing a traffic control policy concerning the traffic control of each of the radio access network nodes to a Near-Real Time RAN Intelligent Controller (Near-RT RIC), wherein the acquiring the operational states includes the at least one processor acquiring the operational state from the virtual infrastructure through an O2 interface, wherein the issuing the operational policy includes the at least one processor issuing the resource allocation policy to the virtual infrastructure through the O2 interface, wherein the acquiring the measured operational data includes the at least one processor acquiring the operational data from each of the radio access network nodes through an O1 interface, wherein the issuing the operational policy includes the at least one processor issuing the traffic control policy to the Near-RT RIC through an A1 interface, wherein the Near-RT RIC controls each of the radio access network nodes based on the traffic control policy through an E2 interface, wherein the at least one processor comprises a single machine learning model configured to derive both the traffic control policy and the resource allocation policy from the measured operational data acquired through the O1 interface and the operational states acquired through the O2 interface, wherein the issuing the traffic control policy causes the Near-RT RIC to perform a traffic restriction process to a specific RAN node when reducing traffic at the specific RAN node, the traffic restriction process comprising at least one of:

directing user equipments (UEs) connected to the specific RAN node to other available RAN node;

restricting a communication speed or a communication volume of the UEs connected to the specific RAN node; or restricting a connection of an additional UE to the specific RAN node, and wherein the resource allocation policy issued through the O2 interface causes reduction of allocated resources of the specific RAN node after the traffic of the specific RAN node has been shifted to one or more other RAN nodes by the traffic control policy.

* * * * *